United States Patent [19]

Hashiudo et al.

[11] 4,124,549
[45] Nov. 7, 1978

[54] CORROSION-INHIBITING PLASTIC FILMS

[75] Inventors: Keinichi Hashiudo; Kanji Imanishi, both of Toyohashi, Japan

[73] Assignee: Aicello Chemical Co., Ltd., Toyohashi, Japan

[21] Appl. No.: 604,109

[22] Filed: Aug. 13, 1975

[30] Foreign Application Priority Data

Aug. 22, 1974 [JP] Japan .................................. 49-95512

[51] Int. Cl.$^2$ ............................................. C23F 11/14
[52] U.S. Cl. ..................................... 260/18 N; 422/8; 106/14.42; 252/389 A; 252/390; 260/32.6 PQ; 260/32.6 R; 264/95; 264/211
[58] Field of Search .......................... 264/211, 95, 171; 106/14; 21/2.5 A; 428/221; 252/389 A, 390; 260/32.6 R, 18 N, 32.6 PQ

[56] References Cited

U.S. PATENT DOCUMENTS

| | | | |
|---|---|---|---|
| 2,717,843 | 9/1955 | Wachter et al. | 106/14 |
| 2,829,945 | 4/1958 | Krieg | 106/14 |
| 3,112,159 | 11/1963 | Cappuccio et al. | 264/211 |
| 3,201,363 | 8/1965 | Spurlin | 264/211 |
| 3,413,227 | 11/1968 | Howard et al. | 106/14 |
| 3,882,075 | 5/1975 | Raff | 264/211 |
| 3,936,560 | 2/1976 | Santurri et al. | 106/14 |

FOREIGN PATENT DOCUMENTS

| | | | |
|---|---|---|---|
| 47-4295 | 2/1972 | Japan | 106/14 |
| 49-21223 | 5/1974 | Japan | 106/14 |

Primary Examiner—Jeffery R. Thurlow
Attorney, Agent, or Firm—Lane, Aitken, Dunner & Ziems

[57] ABSTRACT

An extruding and molding material suitable for the production of packaging materials for the protection of metal articles against corrosion is obtained by admixing a thermoplastic resin with an organic monoamine and an acid. The organic monoamine and the acid react to form a volatile corrosion inhibitor at the high temperature encountered in the extruding and molding process.

8 Claims, No Drawings

4,124,549

CORROSION-INHIBITING PLASTIC FILMS

FIELD OF THE INVENTION

The present invention relates to an extruding and molding material suitable for the production of packaging material used for the protection of metal articles against corrosion. More particularly, the present invention relates to an extruding and molding material suitable for the production of transparent and heat-sealable thermoplastic resin packaging materials, capable of providing excellent corrosion protection for metal articles.

BACKGROUND OF THE INVENTION

It has been known that a transparent and heat-sealable film, suitable for use as a corrosion-inhibiting packaging material for metal products, can be obtained by admixing a thermoplastic resin such as a polyolefin with a compound popularly known as a volatile corrosion inhibitor and extruding the resultant mixture in the form of a film. The vapor of the compound inhibits corrosion at the surfaces of the metal products when the metal products are sealed within the films. For the formation of such films, there have been proposed a variety of methods. However, thermoplastic resins and the volatile corrosion inhibitors generally are so incompatible that when they are mixed, the corrosion inhibitors are poorly dispersed within the resins, i.e. dispersion of the corrosion inhibitors in the resins is not satisfactorily uniform. Some of the volatile corrosion inhibitors have melting points higher than the molding temperature of the thermoplastic resins to be used. When the volatile corrosion inhibitor has a higher melting point, the corrosion inhibitor does not melt when the thermoplastic resin is extruded and the result is a poor dispersion. To effect this deficiency the volatile corrosion inhibitor may be used in an increased amount to enable the finally produced film to manifest a sufficiently high corrosion-inhibiting property. However, the use of such large amounts of inhibitor results in a degradation of transparency and strength of the formed film. Moreover, because of the poor dispersion of the corrosion inhibitor as described above, the volatile corrosion inhibitor contained within the film quickly bleeds to the surface of the film in a short period of time and consequently, by dissipating the vapor too quickly, the film can not retain the corrosion-inhibiting effect for a long period of time and the heat-sealability and strength of the film is reduced.

In the specification of Japanese patent publication No. 4,295/1972, there is disclosed a method for the production of a corrosion-inhibiting plastic film, wherein a polyolefin is used in combination with a polar resin such as an ethylene-ethyl acrylate copolymer, an ethylene-acrylic acid copolymer or an ethylene-vinyl acetate copolymer to improve the compatibility and dispersibility of the volatile corrosion inhibitor with the polyolefin and consequently produce a corrosion-inhibiting plastic film which contains the volatile corrosion inhibitor in a high ratio, which is not subject to surface bleeding of the corrosion inhibitor and which provides a lasting corrosion-inhibiting effect. This method is effective to some extent in uniformly dispersing the volatile corrosion inhibitor. Since this method requires the polyolefin to be used in combination with a considerably large amount of the polar resin (of the order of 15 to 40 parts by weight per 100 parts by weight of polyethylene in accordance with working examples cited in the specification of Japanese patent publication No. 4,295/1972), the corrosion-inhibiting film produced by this method combines the properties of the polyethylene and the polar resin at a sacrifice of the excellent properties of polyethylene film in packaging applications. To be specific, the polar resin has higher flexibility and a lower softening point than polyethylene. When they are blended and extruded in the form of a film, the film suffers from various disadvantages such as inferior strength, heat resistance and antiblocking.

SUMMARY OF THE INVENTION

It is, therefore, an object of the present invention to provide an extruding and molding material suitable for the production of formed articles of thermoplastic resin, possessing an excellent corrosion-inhibiting property. It is a further object to provide a uniform dispersion of the volatile corrosion inhibitor in the formed articles to enable the corrosion inhibitor to be incorporated in a high ratio without a degradation in transparency, strength or thermal adhesiveness and thus allow the corrosion inhibitor to be vaporized slowly without being bleeded rapidly to the film surface and thereby stably protect metal articles from corrosion over a long period of time.

This object and other objects of the present invention will become apparent from the following description.

It has now been discovered that when a thermoplastic resin is admixed with an organic monoamine and an acid which can react to form a volatile corrosion inhibitor at the molding temperature to produce a volatile corrosion inhibitor, the result is that the volatile corrosion inhibitor is dispersed in the formed article with extremely high uniformity.

DETAILED DESCRIPTION OF THE INVENTION

The thermoplastic resins suitable for use in the present invention are not specifically limited. Examples of thermoplastic resins include olefin polymers such as polyethylenes, polypropylenes and polybutene-1; copolymers of ethylene with minor portions (not more than 50% by weight) of one or more unsaturated monomers such as vinyl acetate, acrylic acid and acrylic esters; and polyvinyl chlorides; polyamides; polystyrenes; polycarbonates; polyesters and polyurethanes. Polyethylenes are particularly advantageous where the formed products are intended for use as packaging films and sheets.

The organic monoamines, which serve as one component for the production of the volatile corrosion inhibitor, to be admixed with the thermoplastic resins include aliphatic, alicyclic, aromatic and heterocyclic monoamines. Examples are amyl amine, octyl amine, monoethanol amine, isopropanol amine, dibutyl amine, diisopropyl amine, cyclohexyl amine, dicyclohexyl amine, aniline, diphenyl amine, benzyl amine, naphthyl amine, morpholine, benzotriazole and alkyl benzotriazoles. The acids which serve as the other component for the production of the volatile corrosion inhibitor may be organic acids or inorganic acids. Specific examples are caprylic acid, capric acid, lauric acid, stearic acid, succinic acid, maleic anhydride, phthalic anhydride, benzoic acid, naphthoic acid, citric acid, tartaric acid, nitrous acid, phosphoric acid, phosphorous acid and carbonic acid.

Of the various volatile corrosion inhibitors obtained in the form of organic amine salts by the reaction of the organic monoamines and acids under a high temperature in the extruding and molding process, the preferred are dicyclohexyl ammonium caprylate, diisopropyl ammonium succinate, diisopropyl ammonium nitrite, dicyclohexyl ammonium nitrite, dicyclohexyl ammonium benzoate, diisopropyl ammonium benzoate, morpholine benzoate and benzotriazole caprylate. It is, therefore, particularly advantageous that the organic monoamines and acids which, upon reaction, produce the preferred volatile corrosion inhibitors be suitably combined at the time of use. According to the present invention, the amount of volatile corrosion inhibitor which is contained in the formed articles obtained by extruding and molding the material of the present invention can reach a high level of 20% by weight. Since the volatile corrosion inhibitor contained in the formed articles in the range of from 1 to 10% by weight manifests the expected effect sufficient in most cases for the purpose of the present invention, the corrosion inhibitor is usually used in this range, although the amount of the corrosion inhibitor contained in the formed articles is variable with the particular kind of volatile corrosion inhibitor to be formed and with the type of formed articles consequently obtained.

Further, in the present invention, the organic monoamine is preferred to be used in an amount more than the equivalent weight based on the acid, specifically in the range of from 1.1 to 2.0 times the equivalent weight of acid. It has been confirmed, though for an unknown reason, that when the organic monoamine is present in the extruding and molding material in an excess amount compared with the amount of the acid, there is obtained an extremely advantageous result in that both the compatibility and dispersibility of the formed volatile corrosion inhibitor in the thermoplastic resin are strikingly increased.

The formed articles can simultaneously contain two or more different kinds of volatile corrosion inhibitors. There are cases, for example, where a volatile corrosion inhibitor which quickly vaporizes and provides its effect quickly and another volatile corrosion inhibitor which more slowly vaporizes and provides its effect slowly but over a longer period of time are simultaneously in a given formed article, they can bring about a preferred corrosion-inhibiting effect. Where two or more volatile corrosion inhibitors are formed so as to be contained in a given formed article, therefore, it is preferable that suitable sets of organic monoamines and acids be selected and combined in suitable proportions and admixed with the thermoplastic resin.

The preparation of the extruding and molding material according to the present invention can be accomplished by adding the organic monoamine and the acid in their respective prescribed amounts to the thermoplastic resin and mixing them by agitation in a suitable mixing device such as a ribbon blender or a V-shaped blender at room temperature or below. The resin composition (extruding and molding material) thus prepared is extruded and molded, as with an extruder, to a desired shape at suitable temperature in the range of from 120° to 300° C. The resin composition may be pelletized by an ordinary method as occasion demands.

The corrosion-inhibiting formed article to be obtained by shaping the extruding and molding material of the present invention prepared as described above may be in the form of a film, a sheet, an extrusion coating film, sheet wire or container, for example. For the extruding and molding of such a product, there can be used any of the various known melt-forming methods. In the process of melt-forming, the heating is carried out at an elevated temperature to ensure sufficient melting of the charge and causes the organic monoamine and the acid to react with each other to produce a corresponding acid salt of the organic monoamine as the volatile corrosion inhibitor. Where the formed article is to be used in the form of a film, the extrusion method proves particularly advantageous. In producing a film from a polyethylene-based resin composition incorporating the organic monoamine and the acid, the desired extruding can be readily accomplished, economically and speedily by using an inflation extruding machine of the type used in polyethylene film production under entirely the same conditions as in the ordinary extrusion method.

The manner in which the present invention is put into practice will now be described in detail with reference to the following preferred embodiments.

EXAMPLES 1-6

To 100 parts by weight of a low-density polyethylene having a density of 0.922 and a melt index of 1.2, the organic amines and the acids indicated in Table 1 below were added in the indicated combinations and weight ratios. Each resultant charge was uniformly blended in a ribbon blender at 20° C to produce a resin composition subsequently used as an extruding and molding material.

| Example No. | The organic amines and acids for corrosion inhibitor | Amount added (parts by weight) |
| --- | --- | --- |
| 1. | Dicyclohexyl amine | 2.5 |
|    | Caprylic acid | 1.5 |
| 2. | Dicyclohexyl amine | 1.4 |
|    | Benzoic acid | 0.8 |
| 3. | Monoethanol amine | 2.0 |
|    | Lauric acid | 3.0 |
| 4. | Morpholine | 1.0 |
|    | Benzoic acid | 1.0 |
| 5. | Dicyclohexyl amine | 4.0 |
|    | Benzoic acid | 1.0 |
|    | Caprylic acid | 1.0 |
| 6. | Benzotriazole | 0.5 |
|    | Caprylic acid | 0.5 |

These polyethylene compositions were extruded into tubular films of 0.1 mm in wall thickness by an inflation extrusion machine at the following temperatures.

| Temperature - Cylinder zone, | $C_1$ : 115° C |
| --- | --- |
|  | $C_2$ : 135° C |
|  | $C_3$ : 165° C |
| Die, | $D_3$ : 160° C |

Table 3 shows the corrosion-inhibiting effects which were exhibited by the various films obtained in the preceding examples when they were used in packaging metal plates, together with the physical properties of the films. From Table 3, it is seen that the films produced in the preferred examples of the present invention are superior to those produced in the comparative examples in terms of corrosion-inhibiting effect and physical properties.

COMPARATIVE EXAMPLES 1-3

Tubular films were extruded by following the procedure of Examples 1-6, with the exception that volatile corrosion inhibitors indicated in Table 2 below were directly admixed with the polyethylene instead of having the corresponding organic monoamines and acids blended therein separately from each other. When the tubular films were tested by the same method as in Examples 1-6, there were obtained results which are shown in Table 3.

Table 2

| Comparative Example No. | Volatile corrosion inhibitor | Amount added (parts by weight) |
|---|---|---|
| 1. | Dicyclohexyl ammonium caprylate | 4.0 |
| 2. | Dicyclohexyl ammonium benzoate | 2.2 |
| 3. | Benzotriazole caprylate | 1.0 |

EXAMPLE 7

To 100 parts by weight of an ethylene-vinyl acetate copolymer containing 10% by weight of vinyl acetate and having a density of 0.940 and a melt index of 3.0, 4.0 parts by weight of dicyclohexyl amine and 3.0 parts by weight of caprylic acid were added. They were mixed to prepare a resin composition for extruding.

A high-density polyethylene having a density of 0.950 and a melt index of 0.5 and the above resin composition and the high-density polyethylene were co-extruded in a two-layer T-die extruder to produce a two-ply film in which the ethylene-vinyl acetate copolymer layer containing a volatile corrosion inhibitor had a thickness of 0.06 mm and the high-density polyethylene layer had a thickness of 0.04 mm. The extrusion was carried out under the following molding temperatures.

|  | Ethylene-vinyl acetate copolymer | High-density polyethylene |
|---|---|---|
| Cylinder zone | $C_1$ : 110° C<br>$C_2$ : 130° C<br>$C_3$ : 155° C | $C_1$ : 130° C<br>$C_2$ : 165° C<br>$C_3$ : 200° C |
| Die | D : 150° C | D : 200° C |

The two-ply film thus prepared was subjected to the same test as in Examples 1-6. The results were as shown in Table 3. This film showed highly advantageous values for its various properties.

COMPARATIVE EXAMPLE 4

A two-ply film was molded by following the procedure of Example 7, with the exception that 7 parts by weight of dicyclohexyl ammonium caprylate was added (in place of dicyclohexyl amine and caprylic acid) to the ethylene-vinyl acetate copolymer. The various properties exhibited by this two-ply film are also shown in Table 3.

Table 3

| Test specimen | Haze (%) | Corrosion-inhibitiveness (days) | Heat-seal strength (g/15 mm) | Tensile strength (kg/cm$_2$) | | Elongation (%) | |
|---|---|---|---|---|---|---|---|
| | | | | Longitudinal | Lateral | Longitudinal | Lateral |
| Example 1 | 30.4 | 23 | 1850 | 168 | 125 | 205 | 511 |
| Example 2 | 34.7 | 31 | 1520 | 173 | 152 | 257 | 554 |
| Example 3 | 32.2 | 21 | 1260 | 177 | 149 | 228 | 572 |
| Example 4 | 28.3 | 25 | 1740 | 192 | 184 | 238 | 457 |
| Example 5 | 33.8 | 33 | 1180 | 165 | 141 | 281 | 536 |
| Example 6 | 26.6 | 28 | 2050 | 206 | 187 | 302 | 589 |
| Comparative Example 1 | 46.4 | 11 | 420 | 122 | 65 | 158 | 202 |
| Comparative Example 2 | 42.0 | 16 | 650 | 150 | 93 | 141 | 107 |
| Comparative Example 3 | 39.2 | 7 | 850 | 163 | 138 | 195 | 233 |
| Example 7 | 26.9 | 42 | 1980 | 256 | 385 | 385 | 658 |
| Comparative Example 4 | 35.5 | 28 | 1660 | 232 | 357 | 357 | 589 |

Note 1:
Haze tested in accordance with the method specified by JIS K-6714.
Note 2:
Corrosion-inhibitiveness tested in accordance with JIS Z-0228, with necessary modifications: To be specific, a bag measuring 100 mm × 150 mm was made of a given polyethylene tube and a thoroughly polished metal plate measuring 60 mm × 80 mm and 1.2 mm (thickness) was placed in the bag, with the bag sealed by closing the opening by heat-seal. The test specimen thus prepared was allowed to stand in a constant temperature chamber adjusted to an atmosphere of 49 ± 1° C and 95% RH. Daily, the specimen was checked visually. This check was continued until the day on which the first sign of rusting was observed. The total number of days on which the check was made was reported.
Note 3:
The heat-seal strength was measured by using a bar sealer 1.5 mm in width, with the sealing carried out at 250° C under a pressure of 1 kg/cm$^2$ for 1 second of contact time.
Note 4:
Tensile strength and elongation were tested in accordance with the methods specified by JIS Z-1702.

What is claimed is:
1. A method for producing a corrosion-protective packaging material comprising:
admixing a thermoplastic resin, an acid, and an organic monoamine to form a uniform blend; and
molding or extruding said blend at a temperature sufficient to cause said acid and said organic monoamine to react together to form a dispersion of a volatile corrosion inhibitor within said thermoplastic resin, thereby forming a corrosion-protective packaging material.

2. The method of claim 1 wherein said extrusion or molding temperature is within the range of from 120°-300° C.

3. The method of claim 1, wherein said thermoplastic resin is a polyethylene, a polypropylene, a polybutene-1, an ethylene-vinyl acetate copolymer, a polyvinyl chloride, a polyamide, a polystyrene, a polycarbonate, a polyester or a polyurethane.

4. The method of claim 1, wherein said organic monoamine is amyl amine, octyl amine, monoethanol amine, isopropanol amine, dibutyl amine, diisopropyl amine, benzyl amine, naphthyl amine, morpholine, benzotriazole or an alkyl benzotriazole.

5. The method of claim 1, wherein said acid is an organic acid selected from the group consisting of caprylic acid, capric acid, lauric acid, stearic acid, succinic acid, maleic anhydride, phthalic anhydride, benzoic acid, naphthoic acid, citric acid or tartaric acid.

6. The method of claim 1, wherein said acid is an inorganic acid selected from the group consisting of nitrous acid, phosphoric acid, phosphorous acid and carbonic acid.

7. The method of claim 1 wherein the molar ratio of organic monoamine to acid is within the range of 1.1:1 to 2.0:1.

8. The method of claim 1 wherein said volatile corrosion inhibitor is 1–20% by weight of said packaging material.

* * * * *

UNITED STATES PATENT AND TRADEMARK OFFICE
CERTIFICATE OF CORRECTION

PATENT NO. : 4,124,549
DATED : November 7, 1978
INVENTOR(S) : KENICHI HASHIUDO ET AL It is certified that error appears in the above-identified patent and that said Letters Patent are hereby corrected as shown below:

Page 1, Subtitle "Inventors":

"Keinichi Hashiudo" should read --Kenichi Hashiudo--.

Column 7, line 1, after "amine," (first occurrence) insert --cyclohexyl amine, dicyclohexyl amine, aniline, diphenyl amine, --.

Signed and Sealed this

Tenth Day of April 1979

[SEAL]

Attest:

RUTH C. MASON
Attesting Officer

DONALD W. BANNER
Commissioner of Patents and Trademarks